M. DAVENPORT.
Grain Thrasher and Cleaner.
No. 480. Patented Nov. 23, 1837.
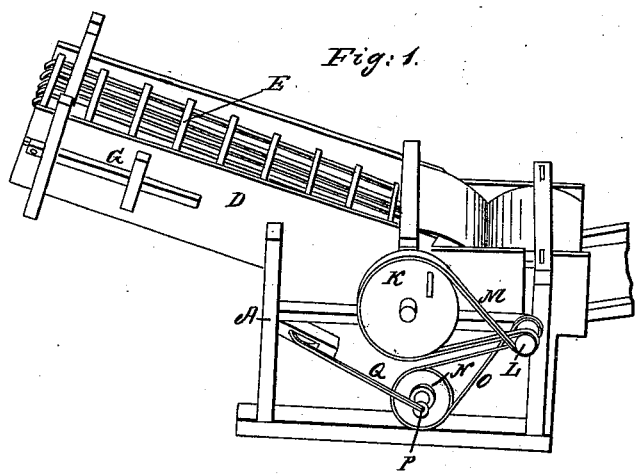
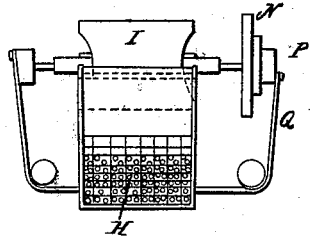
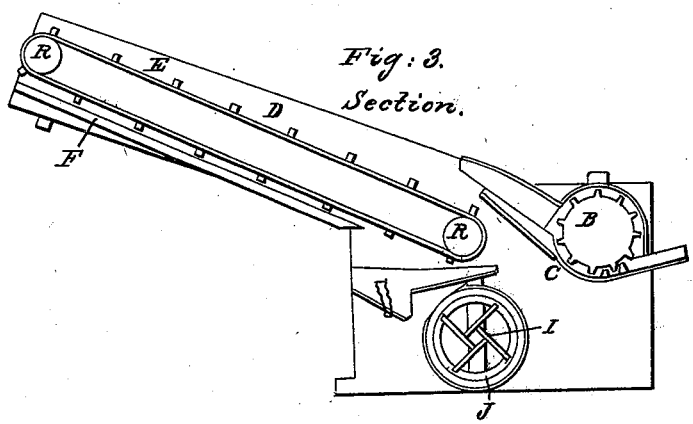

UNITED STATES PATENT OFFICE.

MOSES DAVENPORT, OF PHILLIPS, MAINE.

MACHINE FOR THRESHING AND WINNOWING GRAIN.

Specification of Letters Patent No. 480, dated November 23, 1837.

*To all whom it may concern:*

Be it known that I, MOSES DAVENPORT, of the town of Phillips, in the county of Somerset and State of Maine, have invented a new and useful Improvement in Machines for Threshing and Cleaning Grain, which is described as follows, reference being had to the annexed drawings of the same, making part of this specification.

A, Fig. 1, represents the frame of the machine constructed similar to other machines in use, of a suitable size and strength to contain and support the several parts hereafter described; Fig. 3, B, the threshing cylinder made in the usual manner; C, concave, extended in front of the machine in an inclined position, so as to serve as a feeding board, and nearly to the top of the frame, at the discharging end, so as to form an inclined conductor for conducting the grain while being formed of one piece of sheet iron, or other suitable material; D, an inclined box containing the elevator, said box being secured to the frame of the threshing machine at the rear end of the same, and extended from the end of the concave to any required distance; E, the elevator, just mentioned, constructed by passing several parallel endless straps around two rollers R, R, Fig. 2, both turning on gudgeons, one at each end of the inclined box, to which straps, and at right angles to the same, are fastened a series of parallel slats, or bars of wood, for conveying the straws to the discharging end of the box. The two side straps are placed edgewise and are nailed to the ends of the slats to form a ledging for preventing the straw falling down between the sides of the box and the elevator. Between the slats may be placed a number of parallel strips of leather, or pieces of wood so as to form meshes or spaces of about half an inch for allowing the grain to fall through upon an inclined board below, and at the same time retain the straw upon the elevator which discharges it at the upper end thereof.

F is the inclined board just mentioned. This is placed below the elevator, at the bottom of the box and extends from the end of the frame of the threshing machine nearly to the upper roller. Its upper surface lies parallel with the endless elevator and below it as far as the thickness of the slats, or elevators, which, on their return touch this inclined board. These slats should be about two or three inches wide, or of any proper width, to allow of sufficient space between the outer surface of the endless straps and the upper surface of the inclined board to receive the grain which falls through the meshes of the straps and slats.

G are slides, in which the gudgeons of the upper roller turn, for tightening the straps; H, Fig. 2, screens; I fan; Fig. 3, J, fan-case; K, L, and M, Fig. 1, pulleys and band for turning the elevator; N, O, pulley and band for turning the fan; Figs. 1 and 2, P, Q, crank and strap, for shaking the sieves, a similar crank and strap being placed on the opposite side of the machine. On the opposite end of the threshing cylinder shaft from that on which is placed pulley L, is another pulley, around which passes a band leading to the horse power for working the machine.

A polygonal roller may be placed inside the elevator for shaking it.

Operation: The machine being set in motion, the bundles of straw are united and laid upon the inclined or feeding part of the concave, with the heads toward the threshing cylinder, between which and the concave it is received,—threshed, and thrown, with the grain, upon the elevator, which conveys the straw to the upper end of the inclined box where it is discharged— the grain falling through the meshes or spaces of the elevator upon the inclined board below, where it is met by the slats or bars and carried back toward the threshing cylinder and falls upon the vibrating screens where it is cleaned of all dust and dirt by the revolving fan placed below the screens— the dirt being driven out at the end of the machine while the cleaned grain is received in a box placed below the screens.

The invention claimed by me, the said MOSES DAVENPORT, and which I desire to secure by Letters Patent consists, in—

The combination of the endless revolving elevator with the inclined board which conveys the grain to a fan placed below the threshing cylinder in the manner before described.

MOSES DAVENPORT.

Witnesses:
WM. P. ELLIOT,
WM. BISHOP.